United States Patent
Bezzi et al.

(10) Patent No.: US 10,474,456 B2
(45) Date of Patent: *Nov. 12, 2019

(54) SOFTWARE VERSION FINGERPRINT GENERATION AND IDENTIFICATION

(71) Applicant: SAP SE, Walldorf (DE)

(72) Inventors: Michele Bezzi, Valbonne (FR);
Antonino Sabetta, Mouans Sartoux (FR); Henrik Plate, Valbonne (FR);
Serena Ponta, Antibes (FR); Francesco Di Cerbo, Antibes (FR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,192

(22) Filed: May 17, 2019

(65) Prior Publication Data

US 2019/0272170 A1    Sep. 5, 2019

Related U.S. Application Data

(63) Continuation of application No. 15/371,678, filed on Dec. 7, 2016, now Pat. No. 10,338,916.

(51) Int. Cl.
*G06F 8/71* (2018.01)
*G06F 8/77* (2018.01)
*G06F 8/36* (2018.01)

(52) U.S. Cl.
CPC ............... *G06F 8/71* (2013.01); *G06F 8/36* (2013.01); *G06F 8/77* (2013.01)

(58) Field of Classification Search
CPC .... G06F 8/36; G06F 8/60–8/78; G06F 21/44; G06F 21/45; G06F 21/56–21/57
USPC .............. 717/120–123, 168–178; 726/22–25
See application file for complete search history.

(56) References Cited

U.S. PATENT DOCUMENTS

| | | | |
|---|---|---|---|
| 8,786,785 B2 | 7/2014 | Hendrickson et al. | |
| 8,955,120 B2 | 2/2015 | Antonov et al. | |
| 9,020,952 B2 | 4/2015 | Scott et al. | |
| 9,235,704 B2 | 1/2016 | Wootton et al. | |
| 9,733,930 B2 | 8/2017 | Yu | |
| 10,338,916 B2 * | 7/2019 | Bezzi | G06F 8/71 |
| 2012/0110174 A1 | 5/2012 | Wootton et al. | |

(Continued)

FOREIGN PATENT DOCUMENTS

WO    WO-2015084150 A1    6/2015

OTHER PUBLICATIONS

"U.S. Appl. No. 15/371,678, Examiner Interview Summary dated Jan. 30, 2019", 4 pgs.

(Continued)

*Primary Examiner* — Todd Aguilera
(74) *Attorney, Agent, or Firm* — Schwegman Lundberg & Woessner, P.A.

(57) ABSTRACT

Systems and methods are provided for accessing a source code repository comprising a plurality of versions of code, analyzing the plurality of versions of code of the component to compute metrics to identify each version of code, analyzing the metrics to determine a subset of the metrics to use to as a fingerprint definition to identify each version of the code, generating a fingerprint for each version of code using the fingerprint definition, generating a fingerprint matrix with the fingerprint for each version of code for the software component and storing the fingerprint definition and the fingerprint matrix

20 Claims, 11 Drawing Sheets

(56) References Cited

U.S. PATENT DOCUMENTS

| | | |
|---|---|---|
| 2012/0257116 A1 | 10/2012 | Hendrickson et al. |
| 2013/0086075 A1 | 4/2013 | Scott et al. |
| 2015/0007319 A1 | 1/2015 | Antonov et al. |
| 2016/0147765 A1 | 5/2016 | Glover |
| 2017/0177330 A1 | 6/2017 | Yu et al. |
| 2017/0372072 A1 | 12/2017 | Baset et al. |
| 2018/0157486 A1 | 6/2018 | Bezzi et al. |

OTHER PUBLICATIONS

"U.S. Appl. No. 15/371,678, Non Final Office Action dated Nov. 2, 2018", 30 pgs.

"U.S. Appl. No. 15/371,678, Notice of Allowance dated Feb. 28, 2019", 13 pgs.

"U.S. Appl. No. 15/371,678, Response Filed Jan. 25, 2019 to Non Final Office Action dated Nov. 2, 2018", 22 pgs.

"What is a Vector", [Online]. Retrieved from the Internet: <https://web.archive.org/web/20160703023059/https://www.techopedia.com/definition/22817/vector-programming>, (2016), 1-2.

* cited by examiner

Algorithm 1 Fingerprint Extractor

1: procedure OPTIMAL-METRICS(T)
2:     $N^R \leftarrow \varnothing$     ▷ Selected Metrics: initialized as empty
3:     $Ver_{NI} \leftarrow \{1..m\}$
4:     ▷ Groups of versions not identified by metrics: initialized as all
5:     $Ver_I \leftarrow \{1..m\}$
6:     ▷ Group of versions: temporary
7:     while $Ver_{NI} \neq \varnothing$ do
8:         ▷ Repeat until all versions are identified
9:         $c \leftarrow FindMaxEntropyColumn(T, Ver_{NI})$
10:        $Ver_I \leftarrow FindVerI(T, c, Ver_{NI})$
11:        if $Ver_I \neq Ver_{NI}$ then
12:            $N_R \leftarrow AddMetric(c, N_R)$
13:            $Ver_{NI} \leftarrow Ver_I$
14:            ▷ Remove identified versions and metric c
15:            $Ver_{NI} \leftarrow RemoveUnique(Ver_{NI})$
16:            $T \leftarrow RemoveCol(T, c)$
17:        else     ▷ No progress in the identification: exit loop
18:            break
19:        end if
20:     end while
21:     $T^R \leftarrow T$     ▷ Matrix with the selected metrics for each vers
22:     return $T^R, N_R$
23: end procedure

---

Algorithm 2 Find Column with max entropy per groups of versions

1: procedure FINDMAXENTROPYCOLUMN(T, $Ver_{NI}$)
2:     $N_c \leftarrow NumCol(T)$     ▷ Number of column of T
3:     $Entropy(1:N_c) \leftarrow \varnothing$     ▷ Entropy vector: initialized as empty
4:     for $cl = 1 : N_c$ do
5:         $Entropy(cl) = ComputeEntropyGroup(T(:, c), Ver_{NI})$
6:         ▷ Compute Entropy on column cl over groups $Ver_{NI}$
7:     end for
8:     $c = IndexMax(Entropy)$
9:     ▷ Column index corresponding to the Max of vector Entropy
10:    return $c$
11: end procedure

*FIG. 9*

SOFTWARE VERSION FINGERPRINT GENERATION AND IDENTIFICATION

CLAIM OF PRIORITY

This application is a continuation of U.S. patent application Ser. No. 15/371,678, filed on Dec. 7, 2016, which is incorporated herein by reference in its entirety.

BACKGROUND

It is increasingly common for software vendors to include open-source software (OSS) components in their products, incorporating functionalities contributed by the open-source community, in an effort to reduce development and maintenance costs. However, security vulnerabilities that affect such OSS components are inherited by the products that incorporate them. Despite its apparent simplicity, determining what fixes are necessary and effectively applying them turns out to be a difficult problem. In order to address this problem, software vendors are establishing processes to ensure that their entire software supply chain is secured. These processes include tracking and monitoring all OSS components imported as well as reacting to vulnerability disclosures with the timely application of patches.

Despite these efforts, maintaining a healthy code base is still a challenging task. Indeed, the number of OSS components included, even in moderately sized projects, can be unwieldy. While the direct dependencies of a software project can be just a few dozen, these, in turn, bring into the project additional transitive dependencies. As a result, it is not unusual for a software project to embed hundreds of OSS components. The large amount of legacy software in operation and that includes OSS components, whose identity and version is not systematically tracked, makes things even worse.

BRIEF DESCRIPTION OF THE DRAWINGS

Various ones of the appended drawings merely illustrate example embodiments of the present disclosure and should not be considered as limiting its scope.

FIG. 9 shows example algorithms, according to some example embodiments.

DETAILED DESCRIPTION

Figure 1:
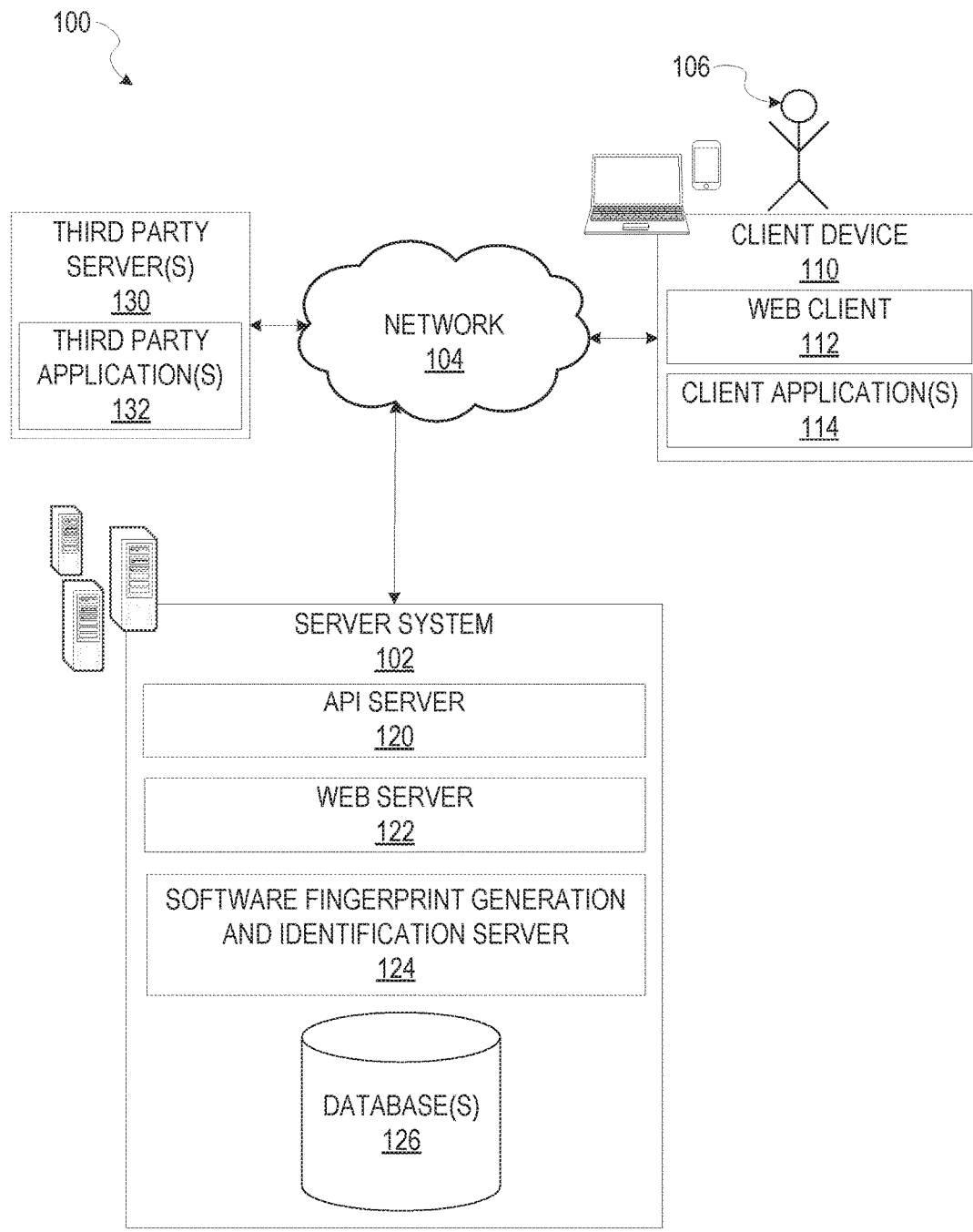
FIG. 1 is a block diagram illustrating a networked system, according to some example embodiments.

Systems and methods described herein relate to generating fingerprints to identify versions of software code, and related functionality.

When vulnerabilities (e.g., security bugs) are discovered, they are typically published as soon as an updated secure version of the affected component is available. Software vendors who include those software components (e.g., OSS components) in their products must be able to quickly assess if the version of OSS components they use is vulnerable or not, because each vulnerability that is published for any of the OSS components that are part of the system needs to be examined and its corresponding patch needs to be applied in order to keep the system secure.

To this aim, it is important to know exactly what components and what versions are included in a product. Most software vendors have governance processes in place able to track the OSS components consumed, however, with the increasing rapidity of release lifecycles and, consequently, the explosion of the number of versions, the information about what exact version of an OSS components has been included in a product is often hard to know. In practice, software vendors face the challenge to identify the exact version of a known OSS component used, the limited usage of standardized metadata to label the different versions, and the said increasing number of versions, which make this, mostly manual, work extremely time consuming and prone to errors.

Example embodiments described herein address this problem by proposing a solution that is efficient, completely automated, and that does not need to rely on the metadata of OSS packages, which in general, cannot be considered a reliable source of information. For example, example embodiments include an automated method to identify a version of a binary software artifact, without relying on its metadata. For example, given a target OSS component, or other software artifact, (e.g., either in source code or compiled form), the method automatically learns an optimal set of metrics that allow it to unambiguously distinguish the version of the target OSS component. After this set of metrics is determined, the values of each metric are computed for each version of the component. These values represent a unique fingerprint that identifies that component version.

When users come across a compiled instance of that component but they ignore its version, they can simply compute the fingerprint of that particular instance and compare it against the set of fingerprints computed earlier, which allows them to associate the correct version. Similarly, fingerprints of new versions can be computed and incorporated into the fingerprint repository in an incremental manner. Fingerprint collisions can occur if a new version has the same fingerprint as a previous version. In this case, the fingerprint definition is extended by adding as many metrics as needed to make the new version distinguishable.

Prior approaches that attempt to identify the version of a software component have a number of limitations. One approach is to examine the metadata for a software component. In practice, however, metadata (e.g., Manifest file and the like) may be incomplete, inaccurate, or completely missing, especially for old components (e.g., commonly found in legacy systems).

The problem of determining the release from which a software artifact (e.g., a JAR file) was produced is typically addressed by computing its hash (e.g., SHA-1) and looking up standard artifact repositories, such as Maven central. This procedure only works when the exact same artifact is known to the repository. For example, it is enough to use different compiler (or different compilation flags) to build the same sources for the hash to be different. Furthermore, it is common practice to re-package binaries in JARs that include class files coming from different OSS components, and it is impossible for artifact repositories to store hashes of all possible repackaging combinations.

Embodiments described herein overcome these limitations and other limitations. For example, for any OSS component, example embodiments can extract a unique fingerprint directly from the compiled artifact. The fingerprint is then compared against a database of fingerprints previously computed for each available version of that component. Because the internal content and structure of the OSS component itself (as opposed to its metadata) defines its identity, this approach provides reliable results even when external sources of identity information (e.g., metadata) are not available.

FIG. 1 is a block diagram illustrating a networked system 100, according to some example embodiments, configured to generate fingerprints for software components and to identify versions of code using the fingerprints. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request fingerprints to be generated for software components, request for version analysis of software code, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a software version analysis application, and the like.

In some embodiments, one or more client applications 114 may be included in a given one of the client device 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access location information, access software version information, to generate fingerprints for software code, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and software fingerprint generation and identification server 124, that may be communicatively coupled with one or more databases 126.

The one or more databases 126 may be storage devices that store data related to fingerprint definitions, fingerprint matrices, metrics for fingerprint generation and identification, product information, software component information, and so forth. The one or more databases 126 may further store information related to third party servers 130, third party applications 132, client devices 110, client applications 114, users 106, and so forth. The one or more databases 126 may be cloud-based storage. In one example, the one or more databases 126 may be a fingerprint repository and/or a fingerprint definition store, as described below.

The server system 102 may be a cloud computing environment, according to some example embodiments. The server system 102, and any servers associated with the server system 102, may be associated with a cloud-based application, in one example embodiment.

The software fingerprint generation and identification server 124 may provide back-end support for third-party applications 132 and client applications 114, which may include cloud-based applications. The software fingerprint generation and identification server 124 may process requests for fingerprints to be generated for software components, process requests for version analysis of software code, and so forth as described in further detail below.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide software version analysis functionality that is supported by relevant functionality and data in the server system 102.

Figure 2:
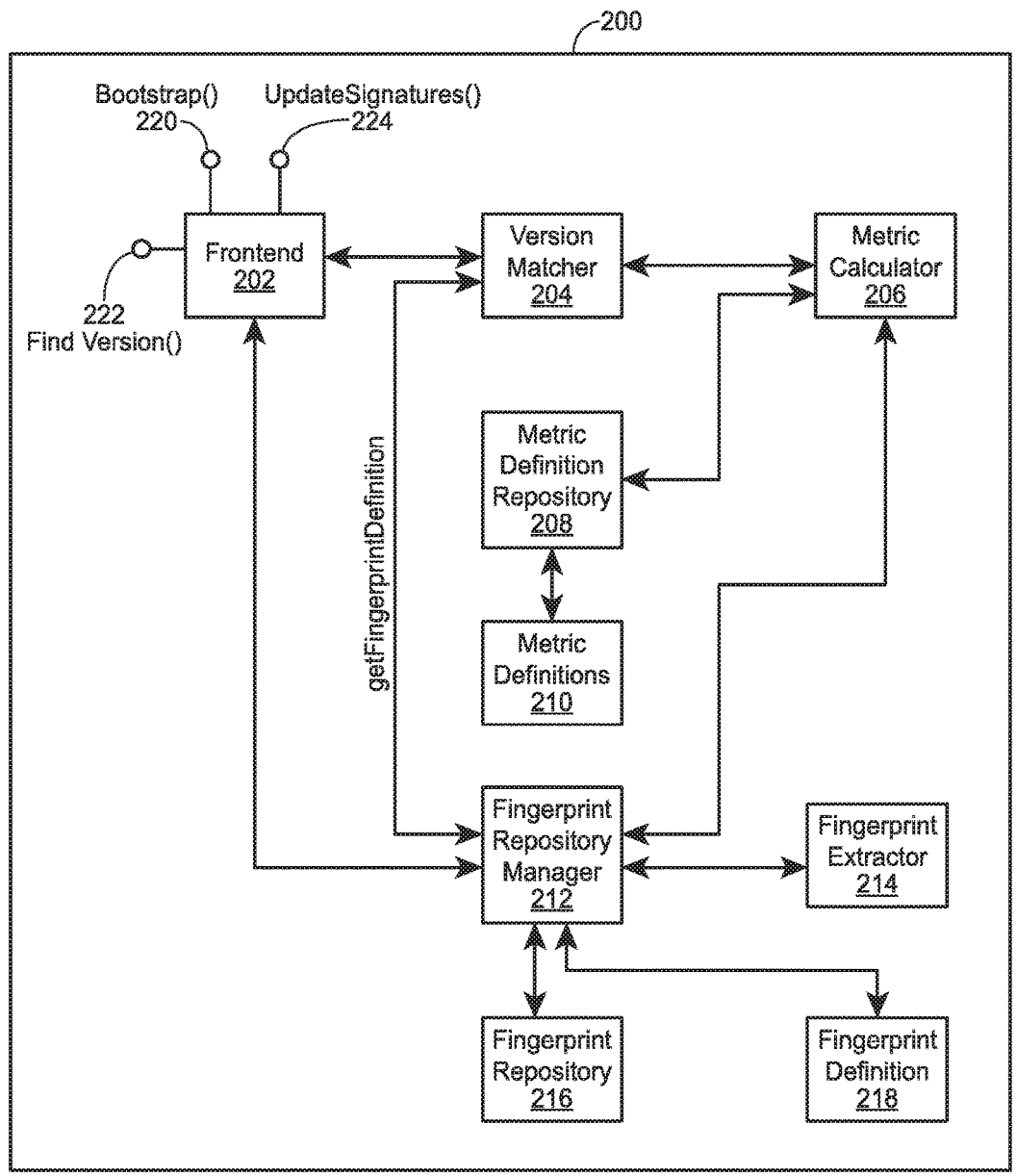
FIG. 2 is a block diagram illustrating a software component version identification system, according to some example embodiments.

FIG. 2 is a block diagram illustrating a software version identification system 200, according to some example embodiments. The software version identification system 200 includes a frontend 202. The frontend 202 may be a computing device (e.g., client computer 110) that can access functionality for software component version identification. The frontend 202 may comprise one or more applications (e.g., client applications 114) such as a software version analysis application. For example, the frontend 202 may comprise a web application, a web service, a standalone application, or other type of application or service that provides a user interface (UI) on the computing device to allow a user 106 of the computing device to request fingerprints to be generated for software components, request version analysis of software code, request updated fingerprints to be generated, and so forth. In one embodiment, the rest of the components (e.g., 204-218) may be part of a back-end system, such as server system 102.

The frontend 202 interfaces with the user 106 to allow a user 106 to choose among various operations. Some operations may include Bootstrap 220, FindVersion 222, and UpdateSignature 224, as described below. The frontend 202 may also include a graphical user interface (GUI) element, referred to as a match meter, to present to the user 106 with results of the user 106's request (e.g., result of a finding/matching process).

The match meter is a GUI element that may give the results to a user 106 in terms of a table listing for each version in the code repository, and how well each version matches to the input bytecode file pkg. Ideally, it returns a 100% matching value for one version only (e.g., exact matching). In some cases it may return multiple versions with 100% matching. In this case the user 106 may need to perform additional analysis. In some cases, it may return no versions with 100% matching. In this case, the input bytecode may have no correspondent in the repository (although "similar" versions may be present, as indicated by the percentage score of the matching).

The software version identification system 200 further includes a metric calculator 206. The metric calculator 206 computes the values of a set of predefined metrics on a code file. For example, the metric calculator 206 may receive a set N of n metrics, a code file pkg, and flag (e.g., indicating if code is source code or bytecode). The metric calculator 206, then fetches the operational instructions for computing the metrics from the metric definition repository 208, and computes the corresponding values on the code file. The metric calculator 206 returns a vector of size n with the values of metrics.

The metric definition repository 208 stores the catalog of metrics that can be used, as well as the instructions to compute them. The software version identification system 200 further includes metric definitions 210.

The fingerprint repository manager 212 provides an interface with the fingerprint data (e.g., fingerprint repository 216 and fingerprint definition 218, and orchestrates the fingerprint matrix building process (e.g., the bootstrap process).

For example, for the bootstrap phase, the fingerprint repository manager 212 may perform the following operations:

1. It receives the source code repository (srcPkg) containing m code versions, and it builds a first matrix, T, composed by code versions (e.g., one for each row) and corresponding metrics values (e.g., one for each column). To this aim, it calls m times (e.g., one for each code version) the metric calculator 206, passing as parameters the corresponding code and the set of all candidate (I) metrics. The m calls return m vectors (of size n), which build the T matrix of dimension m×n, with $T_{ij}$ the value of the metric j computed on the code version i.

2. It finds the minimal set of metrics able to identify all the code versions (e.g., fingerprint). To this aim, it calls the fingerprint extractor 214, passing to it the matrix T, and receiving the fingerprint matrix $T^R$ and the set $N_R$ of the $n_r$ metrics selected (e.g., fingerprint definition). It stores the fingerprint matrix $T^R$ in the fingerprint repository 216 and $N_R$ in the fingerprint definition 218.

3. It stores the fingerprint matrix $T^R$ in the fingerprint repository 216 and $N_R$ in the fingerprint definition 218.

The fingerprint repository 216 stores the fingerprint matrix. The fingerprint definition 218 stores the list of metrics used to compute the fingerprint.

The fingerprint extractor 214 learns the optimal subset of metrics to be used to identify a version of the code (e.g., fingerprint). The fingerprint extractor 214 receives as input a set N of n candidate metrics and a matrix T, with code versions (e.g., one for each row) and candidate metrics as columns. More formally, T is a matrix of dimension m×n, with $T_{ij}$ as the value of the metric j computed on the code version i. The fingerprint extractor 214 returns (1) the set $N_R$ of the $n_R$ metrics selected, with $N_R \subseteq N$, and (2) the fingerprint matrix: a matrix $T^R$ of dimension m×$n^R$, with $T^R_{ij}$ as the value of the metric j computed on the code version i.

The fingerprint extractor 214 performs the following operation of finding the minimal set of metrics able to identify all (or at least the maximum) of the component versions. The details are shown in Algorithm 1 in FIG. 9.

In sum, the process comprises finding the best candidate among the metrics for identifying most of the versions, choosing the metric (e.g., column vector of matrix T) with the largest Shannon entropy contribution (see, e.g., line 9 of Algorithm 1). This metric is added to the set $N^R$ of optimal metrics (see, e.g., line 12 of Algorithm 1). Then the process checks which versions can be identified using such a metric, and removes these version rows and the metric column from the matrix. In addition of versions uniquely identified, the chosen metric can differentiate versions in groups characterized by the same values of the metric. This grouping is maintained (e.g., in the set $V_{erNT}$, line 10 and 13 of Algorithm 1) and, in the following steps, Shannon entropy is computed for each group of versions independently. The process is repeated on the new (e.g., reduced) matrix until: (1) all the versions are uniquely identified by a combination of selected metrics, or (2) considering additional metrics, the process is not able to identify more versions. A more detailed description of the process and learning algorithm is shown in Algorithms 1 and 2 of FIG. 9.

The version matcher 204 matches the input code with the list of versions. It receives as input, a code pkg (e.g., in bytecode), and returns an ordered table listing, for each version in the code repository, the level of matching with the input bytecode file, to be displayed by the match meter. To produce this list, the version matcher 204 first retrieves the fingerprint definition t from the fingerprint definition component 218 (e.g., via the fingerprint repository manager 212), and it calls the metric calculator 206, passing the vector t as a list of metrics, then uses its output to check how close it is to the versions stored in the fingerprint matrix, retrieved from fingerprint repository 216 (e.g., via the fingerprint repository manager 212). The level of matching is evaluated by the distance between the bytecode fingerprint and the fingerprints of the versions (e.g., computing the euclidean distance with the rows of matrix T).

The software version identification system 200 may comprise three primary operations. For example, the software component version identification system 200 may comprise a Bootstrap operation 220, a FindVersion operation 222, and an UpdateSignature operation 224. A summary of each is provided next with further details described below with respect to FIGS. 3-8.

The Bootstrap operation 220 is an initialization phase where the fingerprint matrix is built. A user 106 (e.g., an administrator) submits a source code repository (e.g., via a UI on the frontend 202/computing device 110) containing a number of versions of the code of a component. The system determines the set of characteristics to uniquely distinguish all the versions, and computes the fingerprints for each version. The detailed sequence of steps performed in this phase is described below and shown in FIGS. 3-4.

The FindVersion operation 222 is the main operation of the system 200, described below and shown in FIGS. 5-6. After the bootstrap phase has been performed (e.g., at least once), a user 106 may submit (e.g., via a UI on the frontend 202/computing device 110) a component of an unknown version. The system 200 derives the fingerprint of this component, and matches it against the previously computed version fingerprints (e.g., in the fingerprint matrix). The level of matching is displayed to the user 106 (e.g., via a UI on the frontend 202/computing device 110).

The UpdateSignatures operation 224 is used when new versions of a component become available to update the fingerprint matrix in order to be able to recognize the new versions, as described below and shown in FIGS. 7-8. For example, a user 106 may submit a new version of a component and the system derives its fingerprint and updates the fingerprint matrix. In case the existing fingerprint definitions are not sufficient to uniquely characterize the new version (e.g., there is a collision), the Bootstrap phase may be run again with the whole repository (including the new version).

Figure 3:
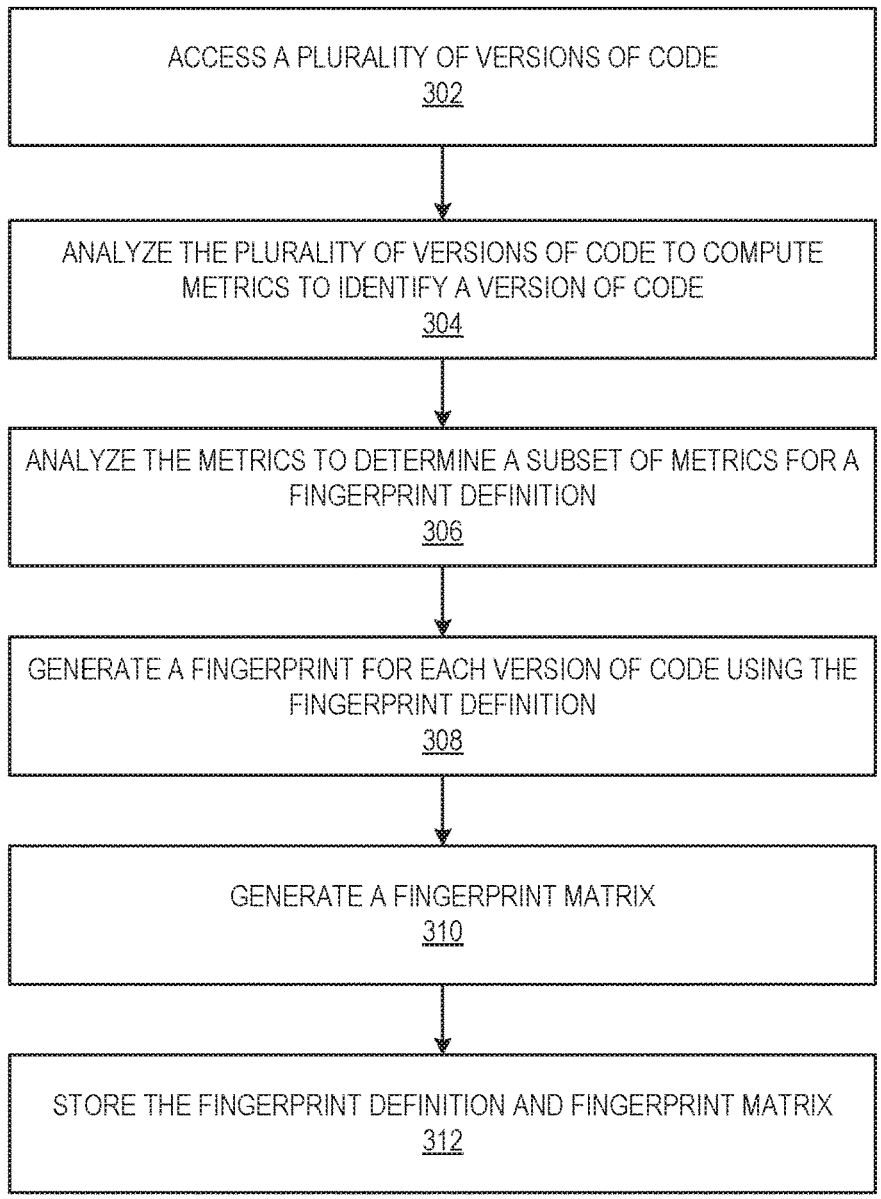
FIG. 3 is flowchart illustrating aspects of a method, according to some example embodiments.
Figure 4:
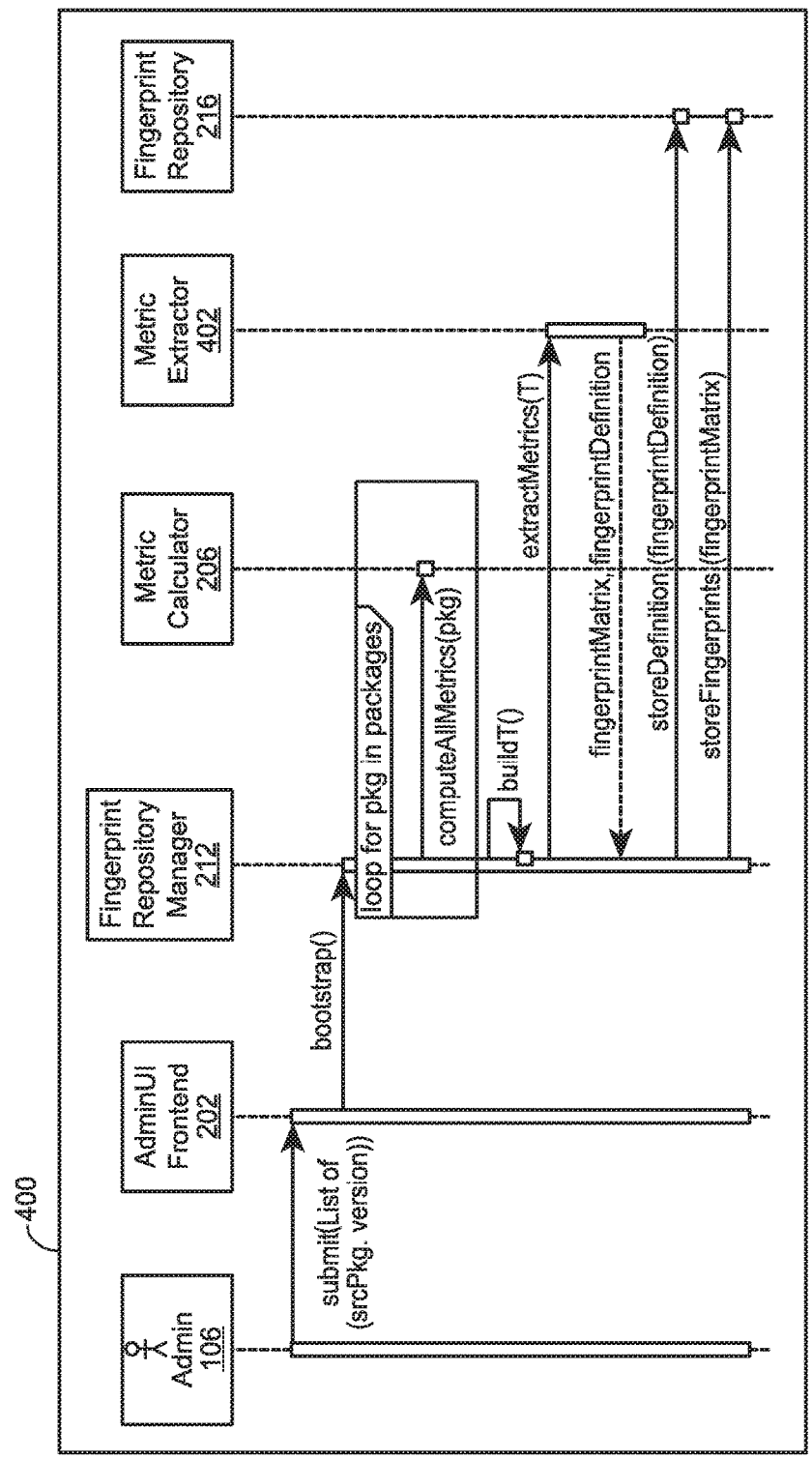
FIG. 4 is a block diagram illustrating a bootstrap operation, according to some example embodiments.

FIG. 3 is a flow chart illustrating aspects of a method 300, according to some example embodiments, for a Bootstrap phase. For illustrative purposes, method 300 is described with respect to the networked system 100 of FIG. 1 and example block diagram in FIG. 4 illustrating a Bootstrap phase 400. It is to be understood that method 300 may be practiced with other system configurations in other embodiments.

A user 106, such as an admin or administrator may use a frontend computing device 202 to submit a source code repository for processing via an administrator UI. In one example, the admin may want to compute fingerprints for all versions of third party components (e.g., OSS components, etc.) that are used in one or more products. In another example, the admin may want to compute fingerprints for all versions of one particular third party component. In yet another example, the admin may want to compute fingerprints for the top most used components in one or more products.

Accordingly, in one example, the source code repository may comprise a plurality of versions of code for a software component. In another example, the source code repository may comprise a plurality of versions of code for a plurality of software components.

A software component may comprise a component for a very specific functionality, a component for several different functionalities (e.g., a set of features), and so forth. For example, one component may perform logging functionality, one component may perform file uploads, one component may do string manipulations, and so forth. Any small function that may be included in a library or a library itself may be a software component.

At operation 302, the server system 102 (e.g., via fingerprint repository manager 212), accesses the source code repository. For example, the fingerprint repository 212 may receive the source code repository directly from the frontend computing device 202, or access the source code repository that is stored in one or more databases 126, or other storage location. The server system 102 (e.g., via the metric calculator 206), analyzes the source code repository (e.g., the plurality of versions of code) to compute metrics (e.g., features) to identify a version of the code, as shown in operation 304. For example, the metric calculator 206 may analyze a plurality of versions of code of a component to compute metrics to identify each version of code for the software component.

In one example, as explained in further detail above, the metric calculator 206 retrieves a set of metrics and then retrieves operational instructions for computing the metrics. The metric calculator 206 computes the corresponding values on the source code repository and generates a vector with the values of the metrics.

A variety of different metrics may be used by the server system 102. For example, existing or future software metrics of different kinds may be used to construct a comprehensive set of metric definitions from which the system 102 may determine the optimal set for a given component (e.g., OSS component).

The choice of metrics to populate the metrics definitions (e.g., the candidate metrics from which the system can determine the optimal fingerprint structure) may be done in such a way that characteristics of different granularity are taken into consideration. In particular, package-level and class-level characteristics may be complemented with finer-grained characteristics that can capture differences across versions at the level of basic blocs or individual lines. A set of metrics that satisfies the above properties could include, for example the following:

name and size of classes
name and size of methods
number of methods
name and type of method parameters, local variables
conditional instruction branching conditions
standard software metrics, such as:
  cyclomatic complexity by method
  (WMC) Weighted methods per class*
  (DIT) Depth of Inheritance Tree*
  (NOC) Number of Children*
  (CBO) Coupling between object classes*
  (RFC) Response for a Class*
  (LCOM) Lack of cohesion in methods*
  (Ca) Afferent couplings
  (NPM) Number of public methods
  and so forth.

The asterisk denotes the metrics commonly known as Chidamber and Kemerer metrics.

At operation 306, the server system 102 (e.g., via metric extractor 402) analyzes the metrics to determine a subset of the metrics to use as a fingerprint definition to identify each version of code (e.g., for the software component). For example, the metric extractor 401 determines what subset of the metrics is sufficient to unambiguously identify each version of code. This may be the optimal subset of metrics that is the smallest amount that will still be able to uniquely identify each version of code (e.g., the minimal set of metrics that are necessary to identify).

In one example, as explained in further detail above, the metrics are stored in a metrics matrix along with the plurality of version of code. The metric extractor 402 analyzes the metrics to determine a subset of the metrics to use as a fingerprint definition to identify each version of the code for the software components, by determining a best candidate metric among the metrics to identify the most versions of the plurality of versions of code by choosing the metric with the largest Shannon entropy contribution as the best candidate metric, adding the best candidate metric to a set of optimal metrics, determining which versions of code of the plurality of versions of code can be identified with the best candidate metric, removing the versions of code of the plurality of version of code and the optimal metrics from the metrics matrix to generate a reduced metrics matrix, and repeating the steps of this process on the reduced metrics matrix until all versions of the plurality of versions of code are uniquely identified by a combination of selected metrics. The set of optimal metrics is the subset of the metrics to use as the fingerprint definition.

In another example, as explained in further details above, the metrics are stored in a metrics matrix along with the plurality of version of code. The metric extractor 402 analyzes the metrics to determine a subset of the metrics to use as a fingerprint definition to identify each version of the code for the software components, by determining a best candidate metric among the metrics to identify the most versions of the plurality of versions of code by choosing the metric with the largest Shannon entropy contribution as the best candidate metric, adding the best candidate metric to a set of optimal metrics, determining which versions of code of the plurality of versions of code can be identified with the best candidate metric, removing the versions of code of the plurality of version of code and the optimal metrics from the metrics matrix to generate a reduced metrics matrix, and repeating the steps of this process on the reduced metrics matrix until it determines that there is one or more versions of code that cannot be uniquely identified using the metrics. The metric extractor 402 then analyzes the plurality of versions of code of the component to compute additional metrics to identify each version of code for the software component.

In one example, the optimal subset of metrics may be calculated for each component. For example, the fingerprint definition may be specific to that component or library, and thus may be used for any versions of code within that component or library. In another example, the optimal subset of metrics may be calculated for all versions of code for all components. In this example, the fingerprint definition is a universal fingerprint definition that is not specific to a component or library (e.g., the universal fingerprint definition may be used to distinguish the identity of any version of code in any component or library).

At operation 308, the server system 102 (e.g., via metric extractor 402) generates a fingerprint for each version of code, using the fingerprint definition. The metric extractor 402 also generates a fingerprint matrix with the fingerprint for each version of software code, as shown in operation 310.

At operation 312, the server system 102 stores the fingerprint definition and the fingerprint matrix. For example, the metric extractor 402 may store the fingerprint definition and the fingerprint matrix in the fingerprint repository 216.

Figure 5:
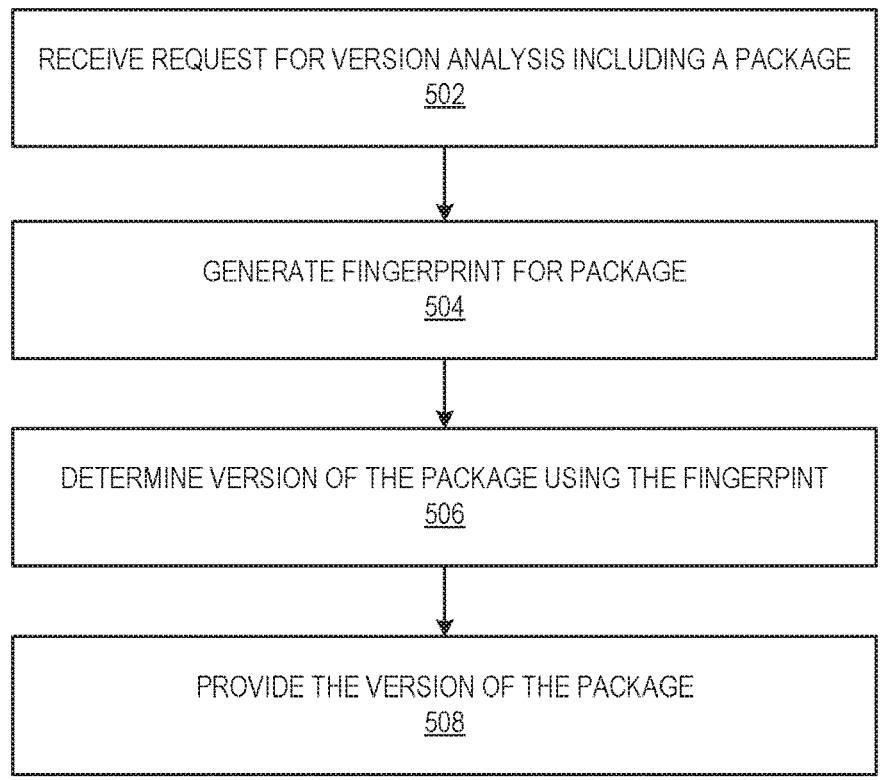
FIG. 5 is a flowchart illustrating aspects of a method, according to some example embodiments.
Figure 6:
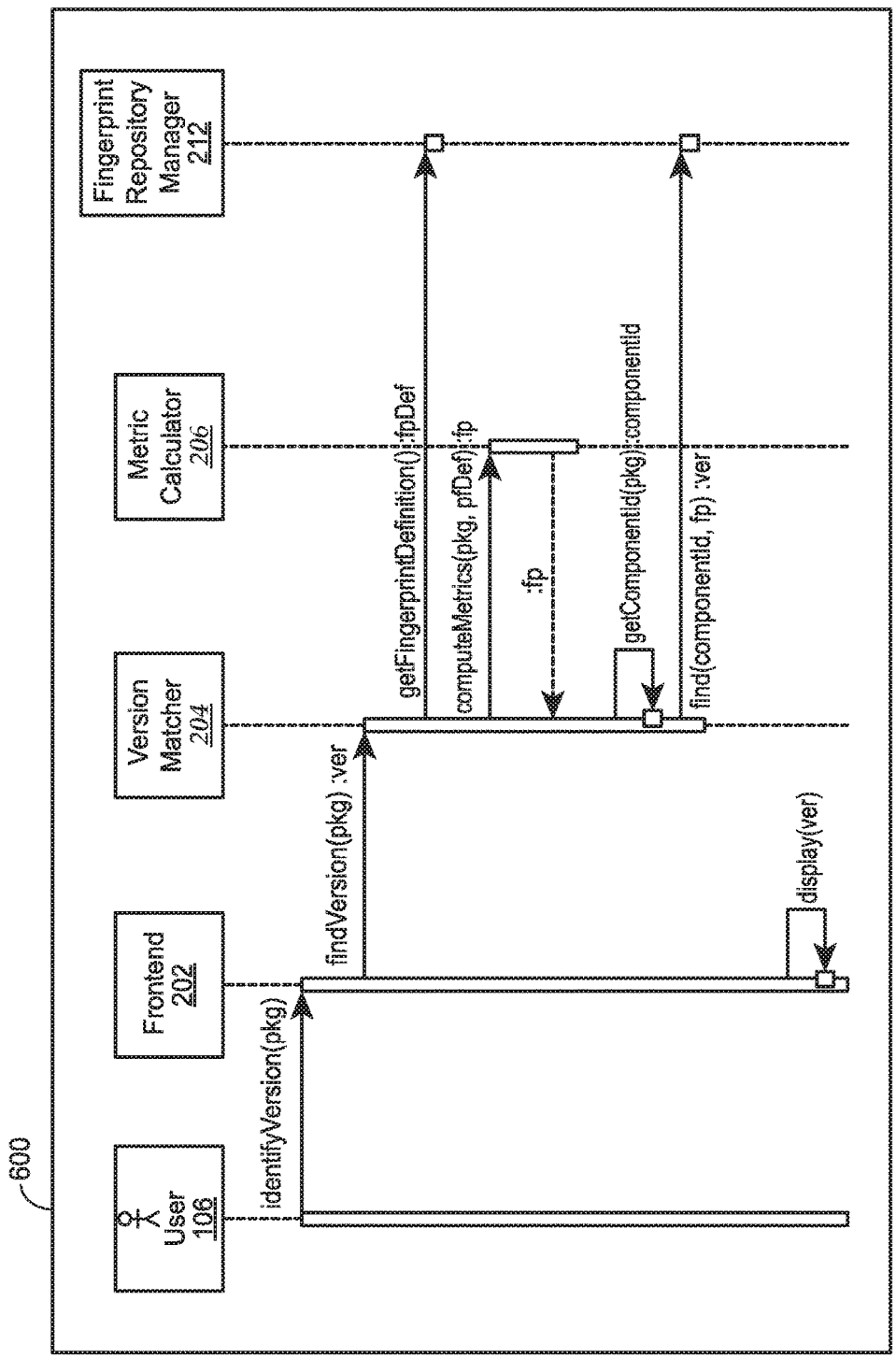
FIG. 6 is a block diagram illustrating a version identification operation, according to some example embodiments.

FIG. 5 is a flow chart illustrating aspects of a method 500, according to some example embodiments, for a FindVersion phase for version identification. For illustrative purposes, method 500 is described with respect to the networked system 100 of FIG. 1 and example block diagram in FIG. 6 illustrating a FindVersion phase 600. It is to be understood that method 500 may be practiced with other system configurations in other embodiments.

A user 106 may wish to know a version of a particular software code. The user 106 may request a version analysis on the software code using a frontend 202/computing device 110. The request may comprise a package of the software code. In one example, the package may be ajar file. In the alternative, the request may comprise an artifact (e.g., a class, descriptor file, etc.) Optionally, the request may also comprise a component identifier (ID) sufficient to identify the component associated with the package or artifact. The following description describes an example with a package, it is to be understood that the package could instead be an artifact.

In operation 502, the server system 102 (e.g., via version matcher 204), receives the request for version analysis, including the package. The server system 102 (e.g., via the metric calculator 206) generates the fingerprint for the package, as shown in operation 504. For example, the metric calculator 206 may access the fingerprint repository manager 212 to retrieve the fingerprint definition (e.g., associated with the software component or a universal fingerprint definition) from the fingerprint repository 216. The metric calculator 206 uses the finger print definition to generate the fingerprint for the package.

In operation 506, the server system 102 (e.g., via version matcher 204) determines the version of the package using the fingerprint for the package. For example, the version matcher 204 accesses the fingerprint matrix stored in the fingerprint repository 216 via the fingerprint repository manager 212. The version matcher 204 looks up the fingerprint in the fingerprint matrix to find what version is associated with the fingerprint for the package. If there is a component name or ID available, the version matcher 204 may also use the component name/ID to look up the fingerprint for the package in the fingerprint matrix. Thus, the version matcher 204 may use just the fingerprint as a lookup key or may use the fingerprint and a component ID.

In operation 508, the version matcher 204 may provide the version of the package to the frontend 202/computing device 110 to be displayed to the user 106. In one example, providing the version of the package may comprise returning the version number to the frontend 202/computing device 110. In another example, providing the version of the package for the component may comprise providing a list with each version of the plurality of versions of the source code repository and a level of matching with the package. The level of matching may be evaluated by computing the Euclidean distance between the package fingerprint and the fingerprints of each version of the plurality of versions, as described above.

Figure 7:
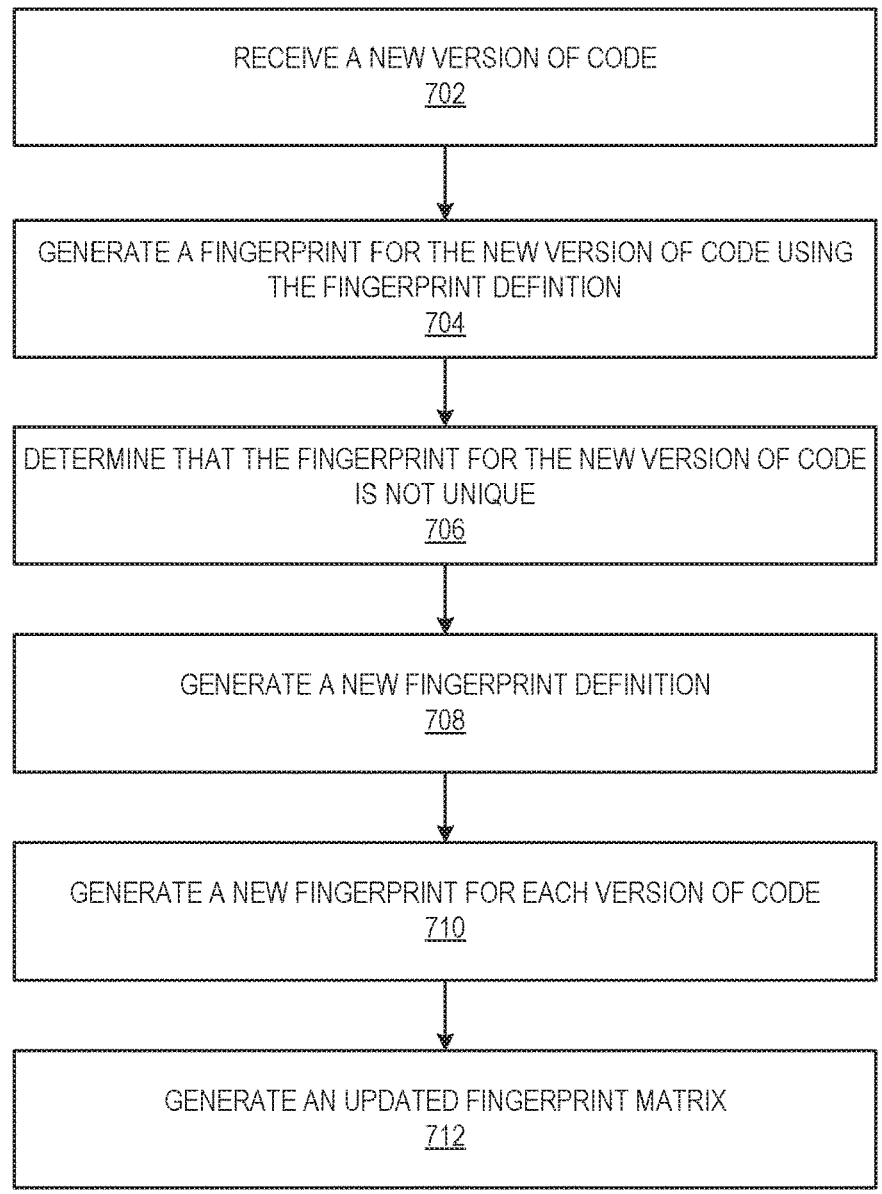
FIG. 7 is a flowchart illustrating aspects of a method, according to some example embodiments.
Figure 8:
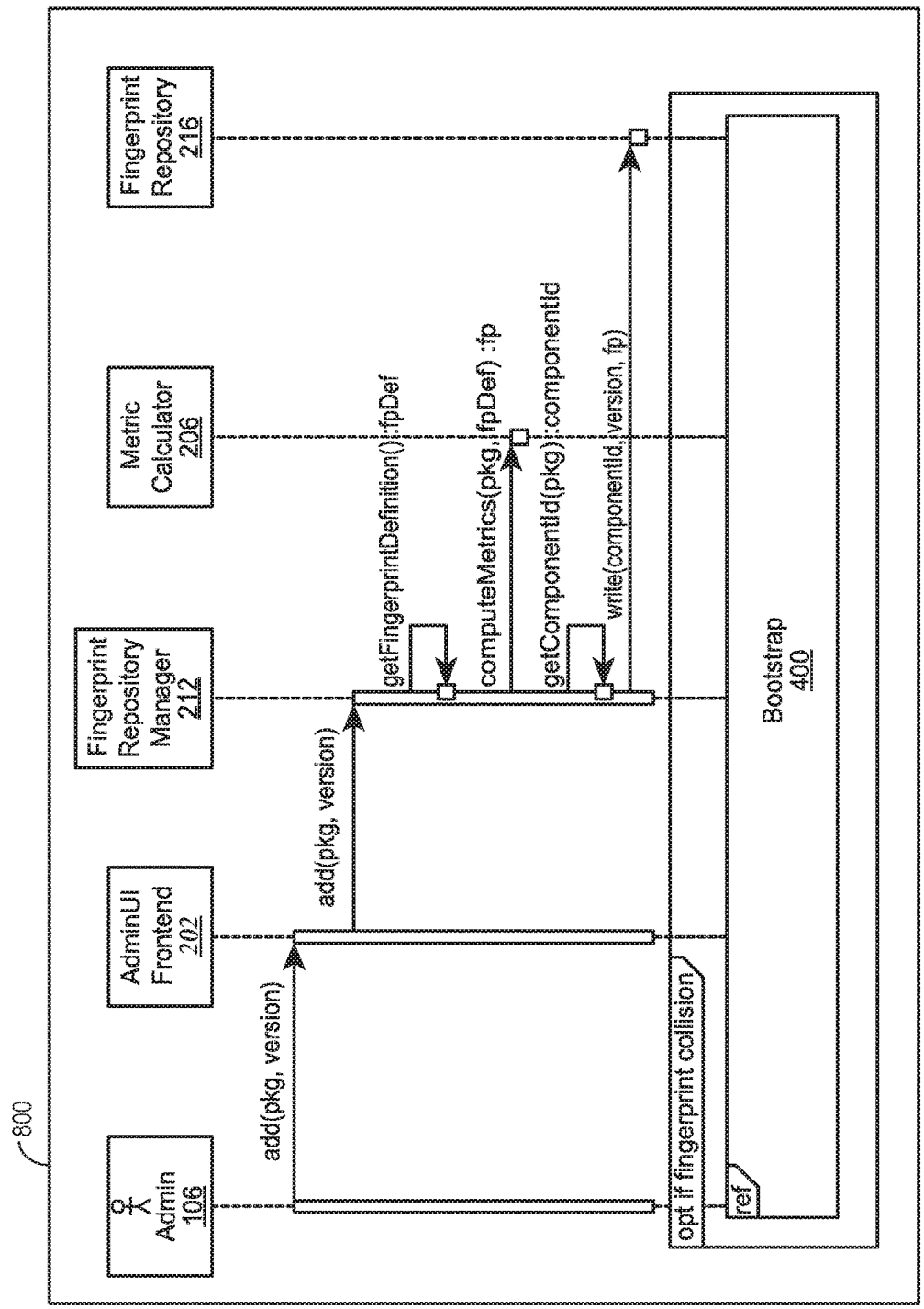
FIG. 8 is a block diagram illustrating a fingerprint repository update, according to some example embodiments.

FIG. 7 is a flow chart illustrating aspects of a method 700, according to some example embodiments, for an UpdateSignature phase for updating a fingerprint repository 216. For illustrative purposes, method 700 is described with respect to the networked system 100 of FIG. 1 and example block diagram in FIG. 8 illustrating an UpdateSignature phase 800. It is to be understood that method 700 may be practiced with other system configurations in other embodiments.

A user 106 (e.g., and administrator) may wish to update the system with a new version of code (e.g., for a software component). The user 106 may use a frontend 202/computing device 110 to send the new version of code to the server system 102 to update the fingerprint repository 216 to include the new version of code.

In operation 702, the server system 102 (e.g., via fingerprint repository manager 212) receives the new version of code. In operation 704, the fingerprint repository manager 212 generates a fingerprint for the new version of code using the fingerprint definition (e.g., a fingerprint definition for the component associated with the new version of code or a universal fingerprint definition). For example, the fingerprint repository manager 212 accesses the fingerprint repository 216 to retrieve the fingerprint definition and the metric calculator 206 computes the fingerprint for the new version of code using the fingerprint definition.

The fingerprint repository manager 212 determines whether or not the fingerprint for the new version of code is unique by accessing the fingerprint matrix to determine if the fingerprint for the new version of code already exists in the fingerprint matrix. If the fingerprint repository manager 212 determines that the fingerprint for the new version of code is unique from other fingerprints in the fingerprint matrix, then the fingerprint repository manager 212 stores the fingerprint for the new version of code in the fingerprint matrix.

If the fingerprint repository manager 212 determines that the fingerprint for the new version of code is not unique from other fingerprints in the fingerprint matrix, as shown in operation 706, it will generate a new fingerprint definition, as shown in operation 708. For example, the server system 102 will use the bootstrap operation 220 described above to generate a new fingerprint definition by analyzing the plurality of versions of code, including the new version of code (for the component if specific to the component, or all versions of code, if not specific to a component), to compute metrics to identify a version of code for the software component. The server system 102 will analyze the metrics to determine a subset of the metrics to use to as a new fingerprint definition to identify each version of the code for the software component.

In operation 710, the server system 102 generates a new fingerprint for each version of code (including the new version of code), using the new fingerprint definition. In operation 712, the server system 102 generates an updated fingerprint matrix with the fingerprint for each version of code. The server system 102 stores the new fingerprint definition and the updated fingerprint matrix in the fingerprint repository 216.

The following examples describe various embodiments of methods, machine-readable media, and systems (e.g., machines, devices, or other apparatus) discussed herein.

Example 1

A computer-implemented method comprising:
accessing, at a server computer, a source code repository comprising a plurality of versions of code for a software component;
analyzing, by the server computer, the plurality of versions of code of the component to compute metrics to identify each version of code for the software component;
analyzing, by the server computer, the metrics to determine a subset of the metrics to use to as a fingerprint definition to identify each version of the code for the software component;
generating, by the server computer, a fingerprint for each version of code for the software component, using the fingerprint definition;
generating, by the server computer, a fingerprint matrix with the fingerprint for each version of code for the software component;
storing, by the server computer, the fingerprint definition and the fingerprint matrix;
receiving, at the server computer, a request for version analysis, the request comprising a package associated with the software component;
generating, by the server computer, a fingerprint for the package using the fingerprint definition;
accessing, by the server computer, the fingerprint matrix to determine the version of the package using the fingerprint for the package; and
providing, by the server computer, the version of the package for the component.

Example 2

A method according to Example 1, wherein analyzing the plurality of versions of code of the component to compute metrics comprises:
retrieving a set of metrics;
retrieving operational instructions for computing the metrics;
computing the corresponding values on the source code repository; and
generating a vector with the values of the metrics.

Example 3

A method according to any of the previous examples, wherein the metrics include at least one from a group comprising: name and size of classes, name and size of methods, number of methods, name and type of method parameters, name and type of local variables, conditional instruction branching conditions, cyclomatic complexity by method, (WMC) weighted methods per class, (DIT) depth of inheritance tree, (NOC) number of children, (CBO) coupling between object classes, (RFC) response for a class, (LCOM) lack of cohesion in methods, (Ca) afferent couplings, (NPM) number of public methods, and Chidamber and Kemerer metrics.

Example 4

A method according to any of the previous examples, wherein the metrics are stored in a metrics matrix along with the plurality of versions of code, and wherein analyzing the metrics to determine a subset of the metrics to use to as a fingerprint definition to identify each version of the code for the software component, is a process comprising:
(1) determining a best candidate metric among the metrics to identify the most versions of the plurality of versions of code by choosing the metric with the largest Shannon entropy contribution as the best candidate metric;
(2) adding the best candidate metric to a set of optimal metrics;
(3) determining which versions of code of the plurality of versions of code can be identified with the best candidate metric;

(4) removing the versions of code of the plurality of versions of code and the optimal metrics from the metrics matrix to generate a reduced metrics matrix; and
(5) repeating (1)-(4) of the process on the reduced metrics matrix until all versions of the plurality of versions of code are uniquely identified by a combination of selected metrics;
wherein the set of optimal metrics is the subset of the metrics to use as the fingerprint definition.

Example 5

A method according to any of the previous examples, wherein the metrics are stored in a metrics matrix along with the plurality of versions of code, and wherein analyzing the metrics to determine a subset of the metrics to use to as a fingerprint definition to identify each version of the code for the software component, is a process comprising:
(1) determining a best candidate metric among the metrics to identify the most versions of the plurality of versions of code by choosing the metric with the largest Shannon entropy contribution as the best candidate metric;
(2) adding the best candidate metric to a set of optimal metrics;
(3) determining which versions of code of the plurality of versions of code can be identified with the best candidate metric;
(4) removing the versions of code of the plurality of versions of code and the optimal metrics from the metrics matrix to generate a reduced metrics matrix; and
(5) repeating (1)-(4) of the process on the reduced metrics matrix until it is determined that there is one or more versions of code that cannot be uniquely identified using the metrics; and
analyzing the plurality of versions of code of the component to compute additional metrics to identify each version of code for the software component.

Example 6

A method according to any of the previous examples, further comprising:
receiving a new version of code for the software component;
generating a fingerprint for the new version of code for the software component using the fingerprint definition;
determining that the fingerprint for the new version of code is unique from other fingerprints in the fingerprint matrix; and
storing the new fingerprint for the new version of code in the fingerprint matrix.

Example 7

A method according to any of the previous examples, further comprising:
receiving a new version of code for the software component;
generating a fingerprint for the new version of code for the software component using the fingerprint definition;
determining that the fingerprint for the new version of code is not unique from other fingerprints in the fingerprint matrix;
analyzing the plurality of versions of code of the component, including the new version of code, to compute metrics to identify a version of the code for the software component;
analyzing, by the server computer, the metrics to determine a subset of the metrics to use as a new fingerprint definition to identify each version of the code for the software component;
generating, by the server computer, a fingerprint for each version of code for the software component, using the new fingerprint definition;
generating, by the server computer, an updated fingerprint matrix with the fingerprint for each version of code for the software component;
storing, by the server computer, the new fingerprint definition and the updated fingerprint matrix.

Example 8

A method according to any of the previous examples, wherein providing the version of the package for the component comprises providing a list with each version of the plurality of versions of the source code repository and a level of matching with the package.

Example 9

A method according to any of the previous examples, wherein the level of matching is evaluated by computing the Euclidean distance between the package fingerprint and the fingerprints of each version of the plurality of versions.

Example 10

A server computer comprising:
a processor; and
a computer-readable medium coupled with the processor, the computer-readable medium comprising instructions stored thereon that are executable by the processor to cause the server computer to perform operations comprising:
  accessing a source code repository comprising a plurality of versions of code for a software component;
  analyzing the plurality of versions of code of the component to compute metrics to identify each version of code for the software component;
  analyzing the metrics to determine a subset of the metrics to use as a fingerprint definition to identify each version of the code for the software component;
  generating a fingerprint for each version of code for the software component, using the fingerprint definition;
  generating a fingerprint matrix with the fingerprint for each version of code for the software component;
  storing the fingerprint definition and the fingerprint matrix;
  receiving a request for version analysis, the request comprising a package associated with the software component;
  generating a fingerprint for the package using the fingerprint definition;
  accessing the fingerprint matrix to determine the version of the package using the fingerprint for the package; and
  providing the version of the package for the component.

Example 11

A server computer according to any of the previous examples, wherein analyzing the plurality of versions of code of the component to compute metrics comprises:
- retrieving a set of metrics;
- retrieving operational instructions for computing the metrics;
- computing the corresponding values on the source code repository; and
- generating a vector with the values of the metrics.

Example 12

A server computer according to any of the previous examples, wherein the metrics include at least one from a group comprising: name and size of classes, name and size of methods, number of methods, name and type of method parameters, name and type of local variables, conditional instruction branching conditions, cyclomatic complexity by method, (WMC) weighted methods per class, (DIT) depth of inheritance tree, (NOC) number of children, (CBO) coupling between object classes, (RFC) response for a class, (LCOM) lack of cohesion in methods, (Ca) afferent couplings, (NPM) number of public methods, and Chidamber and Kemerer metrics.

Example 13

A server computer according to any of the previous examples, wherein the metrics are stored in a metrics matrix along with the plurality of versions of code, and wherein analyzing the metrics to determine a subset of the metrics to use to as a fingerprint definition to identify each version of the code for the software component, is a process comprising:
(1) determining a best candidate metric among the metrics to identify the most versions of the plurality of versions of code by choosing the metric with the largest Shannon entropy contribution as the best candidate metric;
(2) adding the best candidate metric to a set of optimal metrics;
(3) determining which versions of code of the plurality of versions of code can be identified with the best candidate metric;
(4) removing the versions of code of the plurality of versions of code and the optimal metrics from the metrics matrix to generate a reduced metrics matrix; and
(5) repeating (1)-(4) of the process on the reduced metrics matrix until all versions of the plurality of versions of code are uniquely identified by a combination of selected metrics;
wherein the set of optimal metrics is the subset of the metrics to use as the fingerprint definition.

Example 14

A server computer according to any of the previous examples, wherein the metrics are stored in a metrics matrix along with the plurality of versions of code, and wherein analyzing the metrics to determine a subset of the metrics to use to as a fingerprint definition to identify each version of the code for the software component, is a process comprising:
(1) determining a best candidate metric among the metrics to identify the most versions of the plurality of versions of code by choosing the metric with the largest Shannon entropy contribution as the best candidate metric;
(2) adding the best candidate metric to a set of optimal metrics;
(3) determining which versions of code of the plurality of versions of code can be identified with the best candidate metric;
(4) removing the versions of code of the plurality of versions of code and the optimal metrics from the metrics matrix to generate a reduced metrics matrix; and
(5) repeating (1)-(4) of the process on the reduced metrics matrix until it is determined that there is one or more versions of code that cannot be uniquely identified using the metrics; and
analyzing the plurality of versions of code of the component to compute additional metrics to identify each version of code for the software component.

Example 15

A server computer according to any of the previous examples, further comprising:
- receiving a new version of code for the software component;
- generating a fingerprint for the new version of code for the software component using the fingerprint definition;
- determining that the fingerprint for the new version of code is unique from other fingerprints in the fingerprint matrix; and
- storing the new fingerprint for the new version of code in the fingerprint matrix.

Example 16

A server computer according to any of the previous examples, further comprising:
- receiving a new version of code for the software component;
- generating a fingerprint for the new version of code for the software component using the fingerprint definition;
- determining that the fingerprint for the new version of code is not unique from other fingerprints in the fingerprint matrix;
- analyzing the plurality of versions of code of the component, including the new version of code, to compute metrics to identify a version of the code for the software component;
- analyzing, by the server computer, the metrics to determine a subset of the metrics to use to as a new fingerprint definition to identify each version of the code for the software component;
- generating, by the server computer, a fingerprint for each version of code for the software component, using the new fingerprint definition;
- generating, by the server computer, an updated fingerprint matrix with the fingerprint for each version of code for the software component;
- storing, by the server computer, the new fingerprint definition and the updated fingerprint matrix.

Example 17

A server computer according to any of the previous examples, wherein providing the version of the package for the component comprises providing a list with each version of the plurality of versions of the source code repository and a level of matching with the package.

Example 18

A server computer according to any of the previous examples, wherein the level of matching is evaluated by computing the Euclidean distance between the package fingerprint and the fingerprints of each version of the plurality of versions.

Example 19

A non-transitory computer-readable medium comprising instructions stored thereon that are executable by at least one processor to cause a computing device to perform operations comprising:
  accessing a source code repository comprising a plurality of versions of code for a software component;
  analyzing the plurality of versions of code of the component to compute metrics to identify each version of code for the software component;
  analyzing the metrics to determine a subset of the metrics to use to as a fingerprint definition to identify each version of the code for the software component;
  generating a fingerprint for each version of code for the software component, using the fingerprint definition;
  generating a fingerprint matrix with the fingerprint for each version of code for the software component;
  storing the fingerprint definition and the fingerprint matrix;
  receiving a request for version analysis, the request comprising a package associated with the software component;
  generating a fingerprint for the package using the fingerprint definition;
  accessing the fingerprint matrix to determine the version of the package using the fingerprint for the package; and
  providing the version of the package for the component.

Example 20

The non-transitory computer-readable medium according to any of the previous examples, wherein the metrics are stored in a metrics matrix along with the plurality of versions of code, and wherein analyzing the metrics to determine a subset of the metrics to use to as a fingerprint definition to identify each version of the code for the software component, is a process comprising:
  (1) determining a best candidate metric among the metrics to identify the most versions of the plurality of versions of code by choosing the metric with the largest Shannon entropy contribution as the best candidate metric;
  (2) adding the best candidate metric to a set of optimal metrics;
  (3) determining which versions of code of the plurality of versions of code can be identified with the best candidate metric;
  (4) removing the versions of code of the plurality of versions of code and the optimal metrics from the metrics matrix to generate a reduced metrics matrix; and
  (5) repeating (1)-(4) of the process on the reduced metrics matrix until all versions of the plurality of versions of code are uniquely identified by a combination of selected metrics;

wherein the set of optimal metrics is the subset of the metrics to use as the fingerprint definition.

Figure 10:
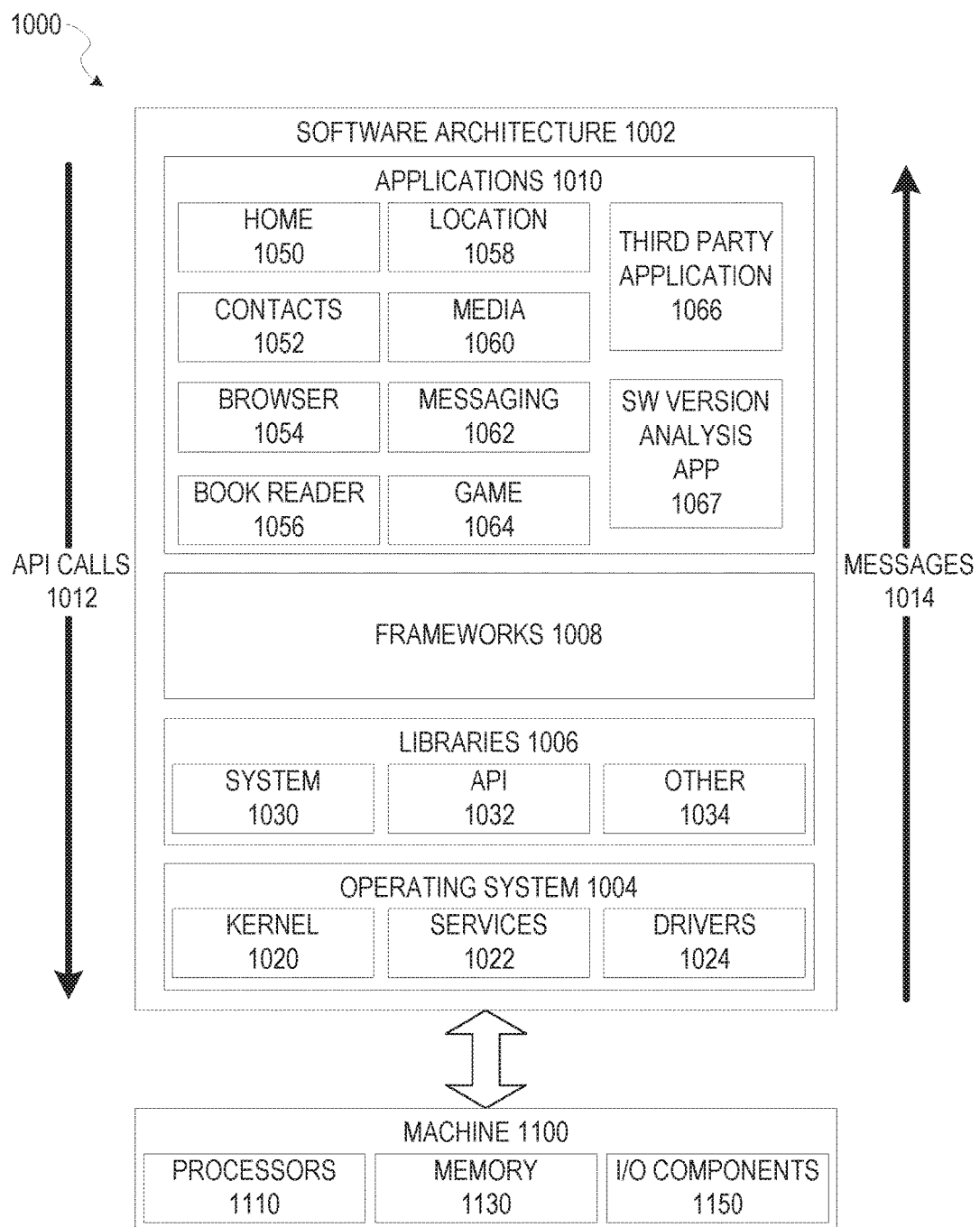
FIG. 10 is a block diagram illustrating an example of a software architecture that may be installed on a machine, according to some example embodiments.

FIG. 10 is a block diagram 1000 illustrating software architecture 1002, which can be installed on any one or more of the devices described above. For example, in various embodiments, client devices 110 and server systems 130, 102, 120, 122, and 124 may be implemented using some or all of the elements of software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party applications 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1066 can invoke the API calls 1012 provided by the operating system 1004 to facilitate functionality described herein.

Some embodiments may particularly include a software version analysis application 1067. In certain embodiments, this may be a stand-alone application that operates to manage communications with a server system such as third party servers 130 or server system 102. In other embodiments, this functionality may be integrated with another application. The software version analysis application 1067 may request and display various data related to software (e.g., version information, metrics, fingerprint information, etc.) and may provide the capability for a user 106 to input data related to the objects via a touch interface, keyboard, or using a camera device of machine 1100, communication with a server system via I/O components 1150, and receipt and storage of object data in memory 1130. Presentation of information and user inputs associated with the information may be managed by software version analysis application 1067 using different frameworks 1008, library 1006 elements, or operating system 1004 elements operating on a machine 1100.

Figure 11:
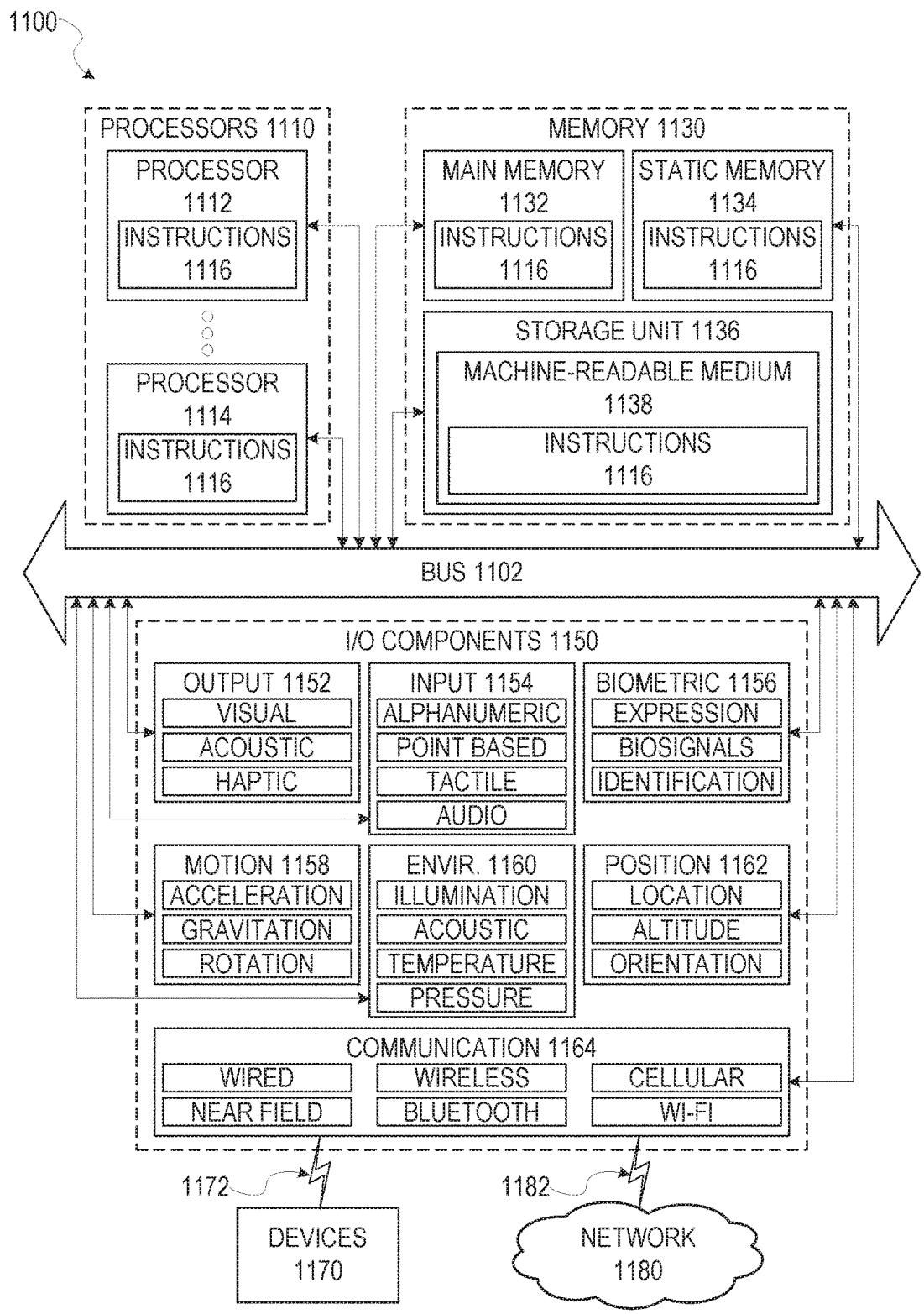
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine 130, 102, 120, 122, 124, etc., or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   accessing, by a computing device, a metrics matrix comprising candidate metrics to identify each version of code of a plurality of versions of code for a software component;
   generating, by the computing device, a fingerprint definition to identify each version of the code for the software component by performing operations comprising:
   (1) determining a best candidate metric among the candidate metrics to identify the most versions of the plurality of versions of code;
   (2) adding the best candidate metric to a set of optimal metrics;
   (3) determining which versions of code of the plurality of versions of code can be identified with the best candidate metric;
   (4) removing the versions of code of the plurality of versions of code that can be identified with the best candidate metric and the best candidate metric from the metrics matrix to generate a reduced metrics matrix; and
   (5) repeating (1)-(4) on the reduced metrics matrix until all versions of the plurality of versions of code are uniquely identified by the set of optimal metrics or until there is one or more versions of code that cannot be uniquely identified using the candidate metrics; and
   based on determining that all versions of the plurality of version of code are uniquely identified by the set of optimal metrics, generating a fingerprint for each version of code for the software component, using the fingerprint definition comprising the set of optimal metrics.

2. The method of claim 1, further comprising:
   generating a fingerprint matrix comprising the fingerprint for each version of code for the software component;
   receiving a request for version analysis, the request comprising a package associated with the software component;
   generating a fingerprint for the package using the fingerprint definition;
   accessing the fingerprint matrix to determine the version of the package using the fingerprint for the package; and
   providing the version of the package for the component.

3. The method of claim 2, wherein providing the version of the package for the component comprises providing a list with each version of the plurality of versions of the source code repository and a level of matching with the package.

4. The method of claim 3, wherein the level of matching is evaluated by computing the Euclidean distance between the package fingerprint and the fingerprints of each version of the plurality of versions.

5. The method of claim 1, further comprising:
receiving a new version of code for the software component;
generating a fingerprint for the new version of code for the software component using the fingerprint definition;
determining that the fingerprint for the new version of code is not unique from other fingerprints in a fingerprint matrix comprising the fingerprint for each version of code for the software component;
generating an updated fingerprint definition to identify each version of the code for the software component by performing operations (1)-(5); and
based on determining that all versions of the plurality of version of code are uniquely identified by the set of optimal metrics, generating an updated fingerprint for each version of code for the software component, using the updated fingerprint definition comprising the set of optimal metrics.

6. The method of claim 5, further comprising:
generating an updated fingerprint matrix comprising the updated fingerprint for each version of code for the software component.

7. The method of claim 1, further comprising:
receiving a new version of code for the software component;
generating a fingerprint for the new version of code for the software component using the fingerprint definition;
determining that the fingerprint for the new version of code is unique from other fingerprints in a fingerprint matrix comprising the fingerprint for each version of code for the software component; and
storing the new fingerprint for the new version of code in the fingerprint matrix.

8. The method of claim 1, further comprising:
accessing a second metrics matrix comprising candidate metrics to identify each version of code of a plurality of versions of code for a second software component;
generating, by the computing device a second fingerprint definition to identify each version of the code for the second software component by performing operations (1)-(5); and
based on determining that there is one or more version of code that cannot be uniquely identified using the candidate metrics, analyzing the plurality of versions of code of the second software component to compute additional candidate metrics to identify each version for the second software component.

9. The method of claim 1, wherein the candidate metrics include at least one from a group comprising: name and size of classes, name and size of methods, number of methods, name and type of method parameters, name and type of local variables, conditional instruction branching conditions, cyclomatic complexity by method, (WMC) weighted methods per class, (DIT) depth of inheritance tree, (NOC) number of children, (CBO) coupling between object classes, (RFC) response for a class, (LCOM) lack of cohesion in methods, (Ca) afferent couplings, (NPM) number of public methods, and Chidamber and Kemerer metrics.

10. The method of claim 1, wherein determining a best candidate metric among the candidate metrics to identify the most versions of the plurality of versions of code comprises choosing a candidate metric with the largest Shannon entropy contribution as the best candidate metric.

11. A computing device comprising:
a memory that stores instructions; and
one or more processors configured to perform operations comprising:
accessing a metrics matrix comprising candidate metrics to identify each version of code of a plurality of versions of code for a software component;
generating a fingerprint definition to identify each version of the code for the software component by performing operations comprising:
(1) determining a best candidate metric among the candidate metrics to identify the most versions of the plurality of versions of code;
(2) adding the best candidate metric to a set of optimal metrics;
(3) determining which versions of code of the plurality of versions of code can be identified with the best candidate metric;
(4) removing the versions of code of the plurality of versions of code that can be identified with the best candidate metric and the best candidate metric from the metrics matrix to generate a reduced metrics matrix; and
(5) repeating (1)-(4) on the reduced metrics matrix until all versions of the plurality of versions of code are uniquely identified by the set of optimal metrics or until there is one or more versions of code that cannot be uniquely identified using the candidate metrics; and
based on determining that all versions of the plurality of version of code are uniquely identified by the set of optimal metrics, generating a fingerprint for each version of code for the software component, using the fingerprint definition comprising the set of optimal metrics.

12. The computing device of claim 11, the operations further comprising:
generating a fingerprint matrix comprising the fingerprint for each version of code for the software component;
receiving a request for version analysis, the request comprising a package associated with the software component;
generating a fingerprint for the package using the fingerprint definition;
accessing the fingerprint matrix to determine the version of the package using the fingerprint for the package; and
providing the version of the package for the component.

13. The computing device of claim 12, wherein providing the version of the package for the component comprises providing a list with each version of the plurality of versions of the source code repository and a level of matching with the package.

14. The computing device of claim 13, wherein the level of matching is evaluated by computing the Euclidean distance between the package fingerprint and the fingerprints of each version of the plurality of versions.

15. The computing device of claim 11, the operations further comprising:
receiving a new version of code for the software component;
generating a fingerprint for the new version of code for the software component using the fingerprint definition;
determining that the fingerprint for the new version of code is not unique from other fingerprints in a fingerprint matrix comprising the fingerprint for each version of code for the software component;

generating an updated fingerprint definition to identify each version of the code for the software component by performing operations (1)-(5); and based on determining that all versions of the plurality of version of code are uniquely identified by the set of optimal metrics, generating an updated fingerprint for each version of code for the software component, using the updated fingerprint definition comprising the set of optimal metrics.

16. The computing device of claim 15, the operations further comprising:

generating an updated fingerprint matrix comprising the updated fingerprint for each version of code for the software component.

17. The computing device of claim 11, the operations further comprising:

receiving a new version of code for the software component;

generating a fingerprint for the new version of code for the software component using the fingerprint definition;

determining that the fingerprint for the new version of code is unique from other fingerprints in a fingerprint matrix comprising the fingerprint for each version of code for the software component; and storing the new fingerprint for the new version of code in the fingerprint matrix.

18. The computing device of claim 11, the operations further comprising:

accessing a second metrics matrix comprising candidate metrics to identify each version of code of a plurality of versions of code for a second software component;

generating, by the computing device a second fingerprint definition to identify each version of the code for the second software component by performing operations (1)-(5); and based on determining that there is one or more version of code that cannot be uniquely identified using the candidate metrics, analyzing the plurality of versions of code of the second software component to compute additional candidate metrics to identify each version for the second software component.

19. The computing device of claim 1, wherein determining a best candidate metric among the candidate metrics to identify the most versions of the plurality of versions of code comprises choosing a candidate metric with the largest Shannon entropy contribution as the best candidate metric.

20. A non-transitory computer-readable medium comprising instructions stored thereon that are executable by at least one processor to cause a computing device to perform operations comprising:

accessing a metrics matrix comprising candidate metrics to identify each version of code of a plurality of versions of code for a software component;

generating a fingerprint definition to identify each version of the code for the software component by performing operations comprising:

(1) determining a best candidate metric among the candidate metrics to identify the most versions of the plurality of versions of code;

(2) adding the best candidate metric to a set of optimal metrics;

(3) determining which versions of code of the plurality of versions of code can be identified with the best candidate metric;

(4) removing the versions of code of the plurality of versions of code that can be identified with the best candidate metric and the best candidate metric from the metrics matrix to generate a reduced metrics matrix; and (5) repeating (1)-(4) on the reduced metrics matrix until all versions of the plurality of versions of code are uniquely identified by the set of optimal metrics or until there is one or more versions of code that cannot be uniquely identified using the candidate metrics; and based on determining that all versions of the plurality of version of code are uniquely identified by the set of optimal metrics, generating a fingerprint for each version of code for the software component, using the fingerprint definition comprising the set of optimal metrics.

\* \* \* \* \*